United States Patent [19]

Polston et al.

[11] Patent Number: 5,713,307

[45] Date of Patent: Feb. 3, 1998

[54] TUG-O-WAR PULL TOY FOR DOGS

[76] Inventors: Michael F. Polston; Cindy L. Gilmore, both of 952 Stellar Ln., Windsor, Calif. 95492

[21] Appl. No.: 667,384

[22] Filed: Jun. 21, 1996

[51] Int. Cl.⁶ .................................................. A01K 29/00
[52] U.S. Cl. .................................................. 119/708
[58] Field of Search .......................... 119/702, 707, 119/709, 710, 708, 711, 769, 795, 798

[56] References Cited

U.S. PATENT DOCUMENTS

| | | | |
|---|---|---|---|
| 2,698,598 | 1/1955 | Hadley | 119/708 |
| 4,542,714 | 9/1985 | Ingraham et al. | 119/708 |
| 4,712,510 | 12/1987 | Tae-Ho | 119/708 |

*Primary Examiner*—Thomas Price

[57] ABSTRACT

A rope tug-o-war pull toy combining a rubber resistance band (2) that provides pull back action when tugged upon, a quick release keyring (3a, 3b, 3c) that attaches easily to a post or beam by way of a simple screw eye (1), or can be disconnected by releasing the ring and connecting end of keyring (3a, 3b) from receiving end (3b, 3c) to form the hand held section of the toy that has an easily held hand grip (6).

1 Claim, 1 Drawing Sheet

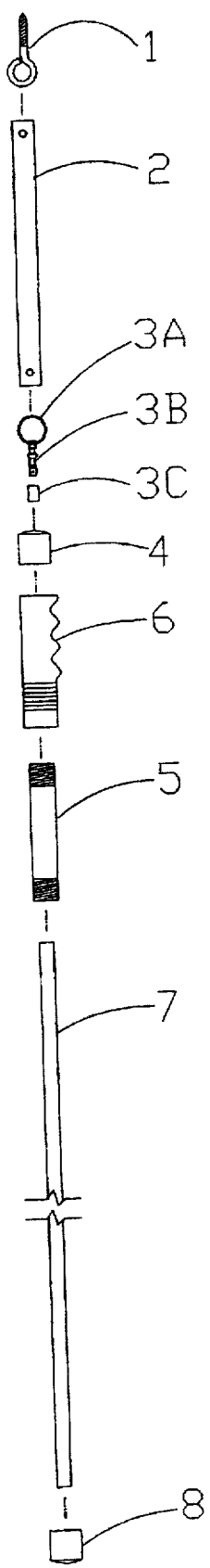

TUG-O-WAR PULL TOY FOR DOGS

BACKGROUND

1. Field of Invention

This invention relates to toys for dogs, specifically to toys that are made for playing tug-o-war and for chewing.

2. Description of Prior Art

Dogs will chew on just about anything from a random length of rope, to shoes, clothing, sticks, rubber balls, etc. We have seen nothing that combines all the elements of this toy as "DOGERCISE" does. A random length of rope or the common rubber keyhole-shape toy can be used to play tug-o-war with a dog. However, someone has to be on the other end of the rope to tug. "DOGERCISE" allows the dog to tug and play alone. There are many dog toys available, but none specifically alike the "DOGERCISE".

Originally this toy was a length of rope tied at one to an eye bolt that was screwed into a fence post. The other end of the rope was left to hang free. Two or more knots were tied in the free hanging end of the rope. This allowed the dog to play tug-o-war with the rope when it was alone. See previously filed disclosure statement.

The toy was then changed to include a metal coil spring approximately 6" in length, the same diameter as the rope, attached between the screw eye and the rope. This gave the toy a pull-back action that the rope by itself did not.

The next change came in the release mechanism. This addition enabled the removal of the toy from the fence post without having to unscrew the screw eye. A quick release keyring type mechanism is placed in between the eye-bolt and the spring. This allows the toy to "hand held".

The next change came when the spring is replaced by a rubber "tie-down" type resistance band. This made the toy safer. A bicycle type handlebar grip is also added so as to make the toy easier to hold.

The rope until this point has been sisal rope. The rope is now changed to softer cotton rope. Veterinarians say the cotton rope is better on the dog's teeth and gums.

Objects and Advantages

The objects of the present form of this invention are:

a) to provide a tug-o-war toy for dogs to chew and tug on when they are left alone in a kennel or yard.

b) to provide a tug-o-war toy for dogs that can be mounted on a post or easily detached for hand held use.

c) to provide a tug-o-war toy for dogs that does not tangle or bind when twisted or tugged.

d) to provide a tug-o-war toy for dogs that gives some pull back action when mounted on a post.

The further advantages of the "DOGERCISE" are that it is easy to attach to a post by use of an eye bolt. If the rope becomes worn or frayed, a new section of rope, sold as a replacement section, can be easily attached.

The "DOGERCISE" is a great toy for dogs that are left alone a lot in a yard or a kennel. This toy can be used by anyone. It allows the dog to play, chew, tug and exercise themselves.

This invention is complex in the fact that it uses many additional parts to achieve the result of a single random length of rope. However, this invention is unique because of its many advantages over the rope. The "DOGERCISE" is completely made up of common items found our local Ace Hardware Stores in Healdsburg, Calif. None of these items would normally be combined in this way. However, when combined to form the "DOGERCISE" they produce a unobvious result. We have developed this invention over many years and many dogs. The invention's present form is described below and in the following drawings. Further objects and advantages will become apparent from review of the following descriptions and drawings.

DRAWING FIGURES

In the drawing nine separate parts are shown. Reference numerals 1 through 8 represent the entire invention. Reference numerals 3a and 3b refer to three separate components of a single part.

Reference numerals 1 through 3b represent the mounted end of the toy. Reference numerals 3c through 8 show the parts of the hand held feature of the toy.

Reference Numerals in Drawings

1. Screw eye
2. Rubber resistance band
3. Quick release keyring
   a. at ring (−) end of keyring
   b. connecting end of keyring
   c. Receiving end of keyring
4. Plastic end cap with interior threads with small hole in end.
5. Length of plastic pipe of approximately 4 inches in length threaded on each end.
6. A standard size bicycle type handlebar grip with end removed.
7. A length of cotton type rope.
8. A second plastic interior threaded end cap with hole large enough for rope to pass through.

DESCRIPTION—FIGURES 1-8

A metal screw eye (1) of approximately 2 inches in overall length. The screw eye is connected to a rubber resistance band (2) of approximately 9 inches in length by passing the eye end of the screw eye through a hole in one end of the rubber resistance band. At the other end of said resistance band is attached a quick release keyring (3) made up of two parts (3a, 3b). The keyring is attached to the resistance band by passing the ring end (3a) through the other hole in said resistance band. The receiving end of the quick release keyring is attached with glue or bonding adhesive to a plastic end cap with interior threads (4) of appropriate size to thread onto said pipe by passing said receiving end through a hole in the top of the end cap large enough for said receiving end to pass through. Said end cap is then screwed onto a length of ¾ inch outside diameter plastic pipe (5) approximately 4 inches in length. A standard size bicycle type handlebar grip (6) with closed end removed creating a completely open-ended grip is then slid over the full length of pipe as would a sleeve covering the pipe. Once the grip is slid over the pipe a length of cotton type rope (7) to which some form of glue or bonding adhesive has been applied bonding for securely to inside of pipe, is slid up inside the length of pipe. A second plastic interior threaded end cap (8) with the cap end removed to form a sleeve or collar with a hole large enough for the rope to pass through is then slid over the rope until it can be threaded onto the length of pipe as to secure the handlebar grip. Knots can be tied at the base end of the rope to adjust length if desired.

Several options are possible with regard to the eventual manufacture of this invention. Specifically, parts 5, 7, and 8 can be manufactured as one piece. The rubber resistance band could be formed to add novelty, in the shape of a dog bone or other shape. The rope is not specifically limited to cotton type rope. The quick release function is not specifically limited to using a key ring type mechanism. Other segmented hardware can be utilized to provide the same result.

A prototype is provided as to allow more specific visual inspection and consideration.

DESCRIPTION OF OPERATION

The "DOGERCISE" can be attached to a wooden beam or post by simply screwing the screw eye end into the beam or post. A dog is then able to pull and tug on the knotted end of the rope.

The quick release function is achieved by compressing the two sections of the keyring together and simply pulling apart while keeping pressure against the ring end of the keyring. Thus transforming the "DOGERCISE" into a hand held toy. The grip is to provide an easy way to hold the toy.

SUMMARY, RAMIFICATIONS AND SCOPE

The reader will see that this "DOGERCISE" invention is a great way to keep your dog entertained when you are not home. It provides an alternative to things you don't want your dog to chew on. It allows an opportunity for them to get exercise merely by tugging and pulling on the rope.

We claim:

1. A tug-o-war pull toy dogs mountable to an appropriate support of substantial strength, comprising a rubber resistance band secured to a screw eye on one end and a conventional quick release key ring on the other end, said quick release keyring releasably joined to a receiving end, said receiving end positioned in a plastic end cap, a rope secured to said end opposite said receiving end, and a handle rigidly secured over said rope adjacent to said end cap.

* * * * *